S. Kaufman,
Scrubbing Brush.
N° 67,058. Patented July 23, 1867.
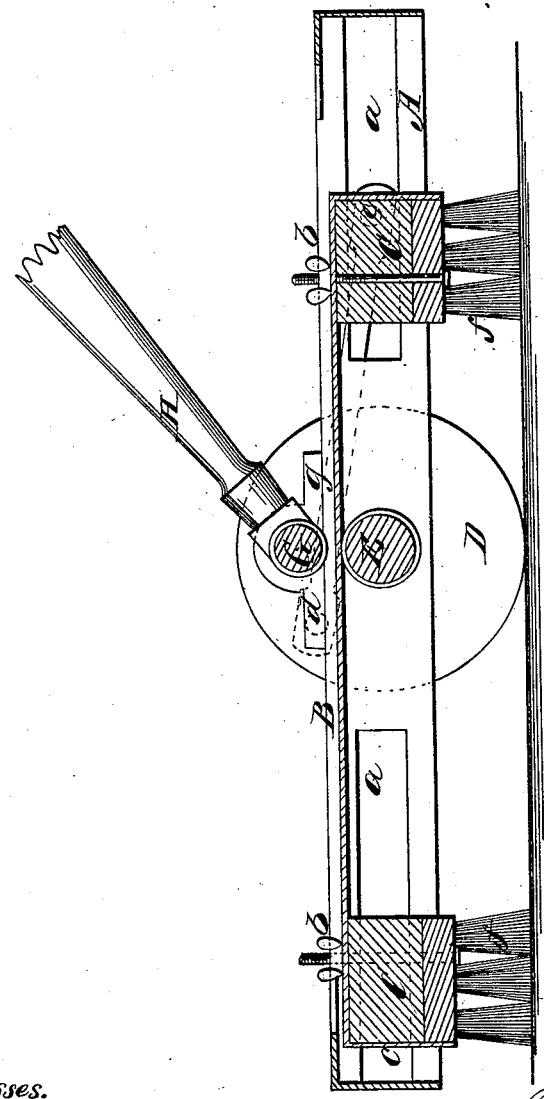
Witnesses.
Theo Inseke
W. Freurn
Inventor:
S. Kaufman
Per Munn & Co
Attorneys

United States Patent Office.

SIMON KAUFMAN, OF FAIRBURY, ILLINOIS.

Letters Patent No. 67,058, dated July 23, 1867.

---

IMPROVED SCOURING AND SCRUBBING MACHINE.

---

The Schedule referred to in these Letters Patent and making part of the same.

---

TO ALL WHOM IT MAY CONCERN:

Be it known that I, SIMON KAUFMAN, of Fairbury, in the county of Livingston, and State of Illinois, have invented a new and improved Scouring and Scrubbing Implement; and I do hereby declare that the following is a full, clear, and exact description thereof, which will enable others skilled in the art to make and use the same, reference being had to the accompanying drawings, forming part of this specification.

This invention relates to an improved implement for scouring and scrubbing; and consists in two or more brushes, carried in a block-frame, which is set in a slotted frame, an alternate motion being given to the block-frame by the revolution of a driving-wheel, which is connected with the block-frame by a crank eccentrically pinned to the wheels. There are two exactly similar wheels, revolving with a common axle, either or both of which may, by connecting with the block-frame, be the driving-wheel or driving-wheels.

The accompanying drawing is a longitudinal section of my improved scouring and scrubbing implement.

A is the slotted frame, $a$ $a$ the slots therein, in which slides the block-frame B', carrying the brush-blocks C C, bolted to the block-frame by the screw-bolts $b$, and carrying brushes $f$, or rubber scrubbers, or any other equivalent for rubbing or scrubbing. The crank $d$ is pinned to the brush-block C at $c$, and eccentrically to the driving-wheel D at $d$. The driving-wheel D revolves with the axle E, and there is another exactly similar wheel in the other end of the axle, which may be made the driving-wheel instead of D, or both may act together as driving-wheels. These wheels are made very broad, that they may not mark the floor or carpet. A cross-piece, G, set in bearings $g$ on the top of the frame A, receives the handle H, and by merely pushing the implement along over the floor the driving-wheel conveys a reciprocating motion to the brush-block, while the brushes scrub the floor. By means of the screw-bolts $b$ the brushes can be adjusted as they wear away. These wheels will each have on them an India-rubber tire, to prevent their slipping on the floor oil-cloth.

What I claim as new, and desire to secure by Letters Patent, is—

1. The brush or scrubber $f$, or its equivalent, set in a block C, in combination with a slotted-frame A, and having a reciprocating motion imparted to it by the driving-wheel D, or in any equivalent manner, operating in manner and for the purposes substantially as herein shown and described.

2. The block-frame B, carrying the brushes or scrubbers $f$, or their equivalents, in combination with the slotted frame A, in manner substantially as and for the purposes described.

3. The slotted frame A, handle H, cross-piece C, all as set forth, and their respective equivalents, in combination with the driving-wheels D and axle E, block-frame B, and crank $d$, and their respective equivalents, substantially as herein shown and described.

SIMON KAUFMAN.

Witnesses:
C. B. ALFORD,
R. L. PATTON.